United States Patent
Terada

[11] Patent Number: 5,358,204
[45] Date of Patent: Oct. 25, 1994

[54] FOLDING KEYBOARD STAND

[75] Inventor: Hideaki Terada, San Diego, Calif.

[73] Assignee: Casio Manufacturing Corporation, San Diego, Calif.

[21] Appl. No.: 130,869

[22] Filed: Oct. 4, 1993

[51] Int. Cl.⁵ .............................. F16M 11/20
[52] U.S. Cl. ................... 248/164; 108/118; 403/93
[58] Field of Search ............ 248/166, 165, 164, 434, 248/188.9; 403/87, 88, 92, 93, 96, 161, 403, 205, 187; 211/203; 108/119, 118

[56] References Cited

U.S. PATENT DOCUMENTS

| | | | |
|---|---|---|---|
| 729,432 | 5/1903 | Sidway | 403/96 X |
| 2,003,844 | 6/1935 | Tintner | 403/97 |
| 2,957,736 | 10/1960 | Olander | 248/164 |
| 3,701,450 | 10/1972 | Belzberg | 248/188.9 |
| 4,190,375 | 2/1980 | Berry | 403/187 X |
| 4,484,832 | 11/1984 | Weissenberger | 403/403 X |
| 4,763,865 | 8/1988 | Danner | 108/118 X |
| 4,917,341 | 4/1990 | Pirchio | 108/118 |
| 5,199,930 | 4/1993 | Weber | 248/164 X |

FOREIGN PATENT DOCUMENTS

| | | | |
|---|---|---|---|
| 2556981 | 7/1976 | Fed. Rep. of Germany | 403/187 |
| 2144454 | 2/1978 | Fed. Rep. of Germany | 248/164 |

*Primary Examiner*—J. Franklin Foss
*Attorney, Agent, or Firm*—Brown, Martin, Haller & McClain

[57] ABSTRACT

A keyboard support stand with legs which pivot around a central axis and may be held in a selected angular relationship by stamped engagement discs with mating spaced protrusions and indentations. The discs are received over the legs and when they are together, sufficient locking force is developed to support substantial loads. Cross-arms on each end of the legs from feet and load-support members. The cross-arms are seared in place using fasteners received within the legs.

20 Claims, 2 Drawing Sheets

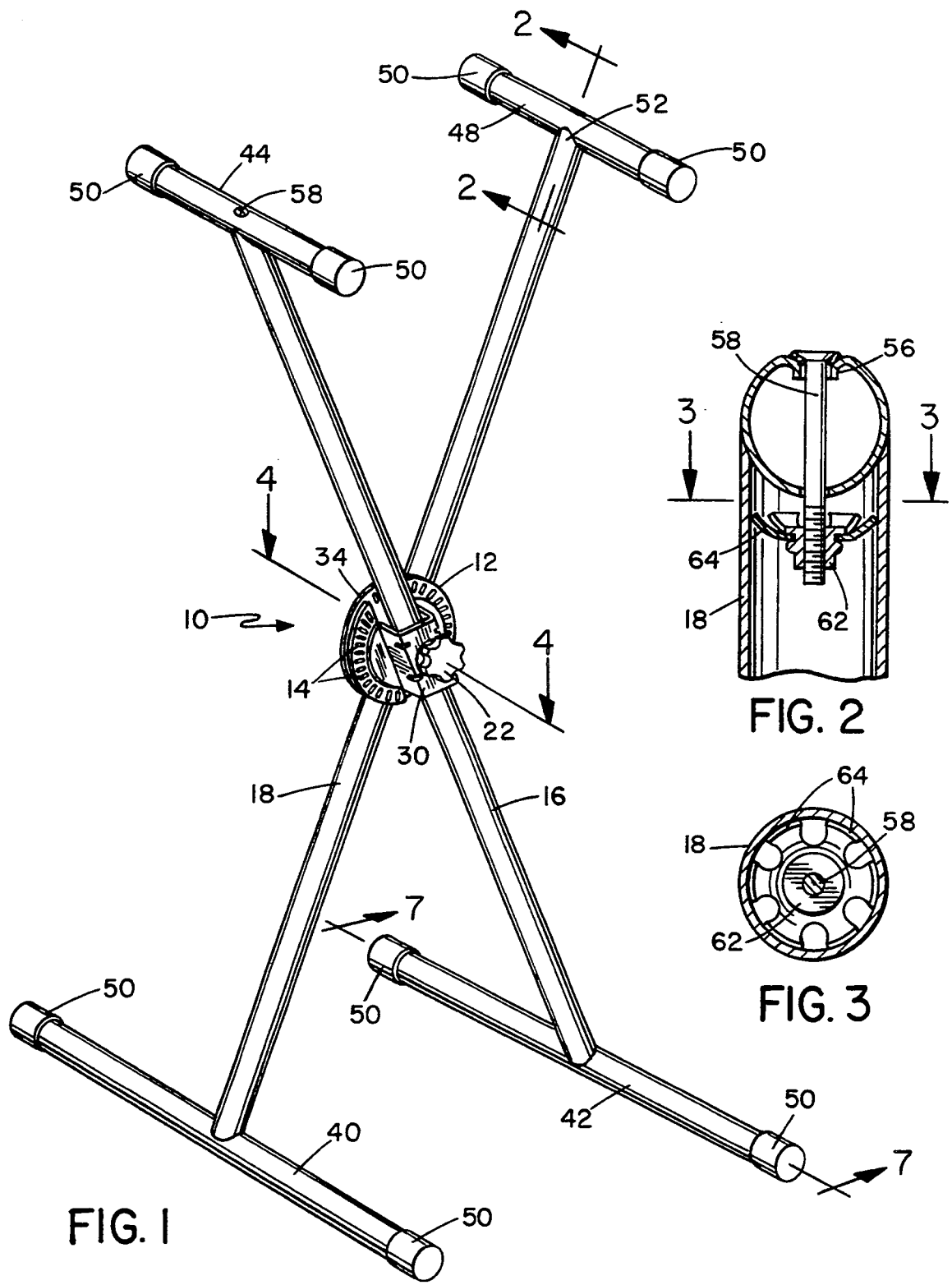

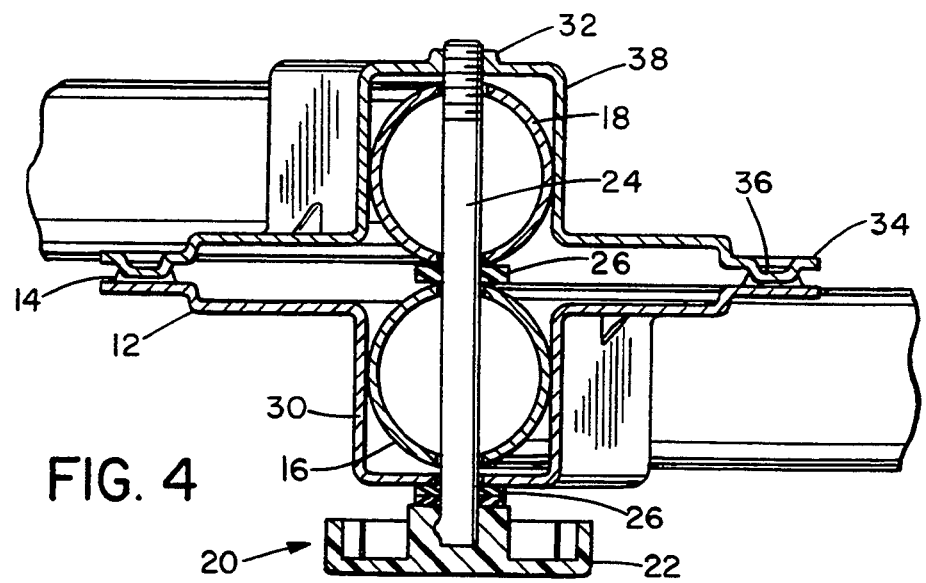
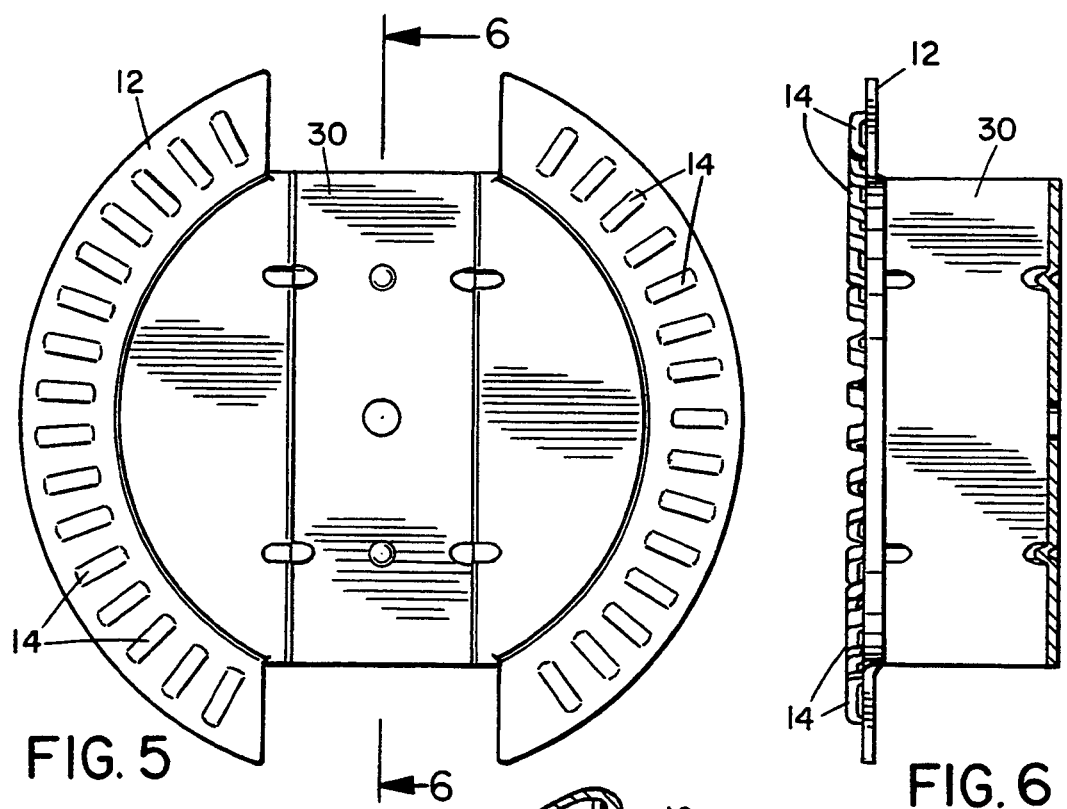
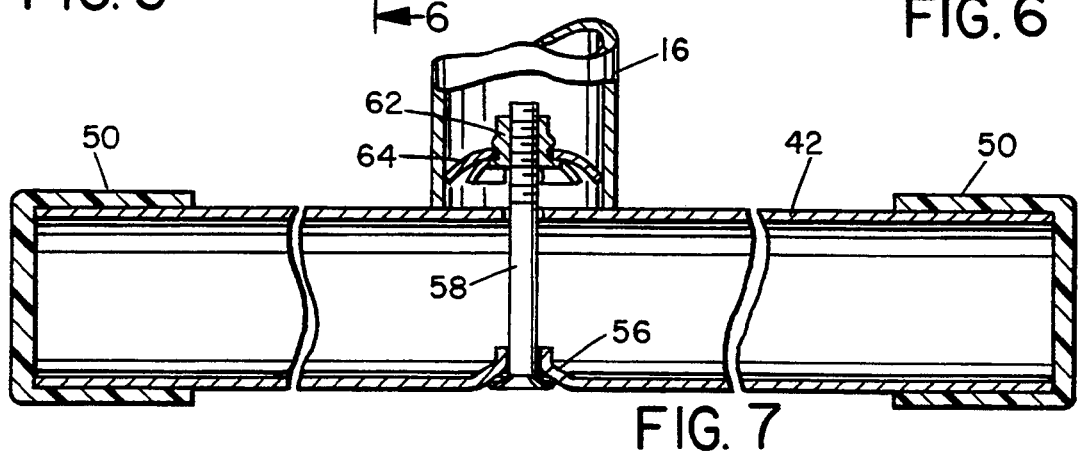

FOLDING KEYBOARD STAND

BACKGROUND OF THE INVENTION

Most keyboard instruments, including those used professionally and those used in the home, are not set up permanently. Therefore, a folding load support stand is necessary so that the keyboard and stand can be put away when not in use, and transported to other locations. A number of prior art devices use a scissoring pivoting legs to provide a folding stand. Each end of the scissoring legs has cross legs on it. The lower cross legs form feet and are used to provide stability, and the upper cross legs are used as load members to support the underside of the keyboard or other load. Since keyboards may be utilized in both sitting and standing modes, the angle of scissoring is varied to vary the height of the keyboard above the floor.

Some prior scissoring keyboard stands have an interconnection cross-member near the top of the stand. The cross-member may be in the form of a solid bar with a series of perforations so that when the stand is scissored for maximum height, such as when the user is standing, the bar protrudes beyond these scissoring members and sometimes even beyond the end of the keyboard. This produces an unattractive stand and one liable to upset if a person brushes against the cross-member (especially if this takes place before the keyboard is in position). Another approach is to use a flexible member such as a chain to connect between the two parts. Such stands are insubstantial in appearance and very unstable, especially when there is no weight on the stand, or when an upsetting force is placed on the keyboard (as by somebody brushing against the keyboard).

Therefore, for reasons of stability and appearance, it is desirable to lock the scissoring legs at their pivot point into a selected angular relationship, One prior art device utilizes a disc welded or otherwise attached to one of the scissoring legs at the pivot point and a spring pin which protrudes through the other of the legs. A plurality of openings in the disc produce a limited number of adjustment positions. However, the spring pin components are very expensive to manufacture, and the limited selection of adjustment positions doesn't accommodate individual height preferences. In addition, welding is expensive to apply to high production rate products.

Accordingly, it is desirable to have a scissoring keyboard stand which locks into a substantial number of angular relationships between the pivoting legs, and which does not require expensive spring pins, castings, welding or machined parts, and yet presents a finished and durable appearance.

SUMMARY OF THE INVENTION

In the exemplary embodiment, the present invention overcomes the disadvantages of the prior art in a low-cost, lightweight and easily produced configuration with a large number of locked angular adjustments, Contrary to conventional practice, the invention employs a plurality of stamped engagement discs. The diameter of the discs must be greater than 3 inches and preferably greater than 4 inches to achieve adequate circumferential clamping engagement. Most desirably, the discs are 4.1 inches in diameter. Unitary stamped engagement pieces can be punched out in a single press operation to include a channel into which the cross legs are received, and a series of indentations and corresponding protrusions which are dimensionally compatible so that the protrusions on one disc are received into the indentations on the companion disc. The depth of the indentations and the height of the protrusions are most desirably approximately 0.1 inches. It has been found that the indentations will not reliably develop adequate force, even with a 4 inch diameter disc, if they are less than 0.08 inches in depth. Depths greater than 0.20 inches are not economically achievable in a single stamping operation, and have unsatisfactory disengagement-reengagement properties. It has been discovered that by so sizing the discs, and the indentations/protrusions, it is possible to develop sufficient clamping force with a simple hand-operated screw that the stand will support a keyboard and associated weight in excess of 110 pounds and with adequate safety margins.

The legs terminate in part circular cross-channels to receive the feet and load support members. Spring nuts are received within the legs to give the junction of the legs and cross-members a finished high-strength connection without the necessity of welding.

Thus, an adjustable keyboard stand has been produced where the principal adjustment components are a unitary stamping (two of each which may be employed on the stand) and a hand screw received through one stamping and threaded into the opposed stamping. No castings, high-cost alloys or machining, springs or other moving parts are required.

BRIEF DESCRIPTION OF THE DRAWINGS

FIG. 1 is a perspective view of the assembled stand;

FIG. 2 is an enlarged sectional view taken on line 2—2 of FIG. 1;

FIG. 3 is a sectional view taken on line 3—3 of FIG. 2;

FIG. 4 is an enlarged sectional view taken on line 4—4 of FIG. 1;

FIG. 5 is a view of the inside face of one engagement disc, the other being similar;

FIG. 6 is a sectional view taken on line 6—6 of FIG. 5; and

FIG. 7 enlarged sectional view taken on line 7—7 of FIG. 1.

DETAILED DESCRIPTION OF THE DRAWINGS

Referring now to the drawings in which like reference numerals refer to like parts throughout, and in which:

FIG. 1 illustrates the support stand 10 of the invention incorporating pivoting legs 16 and 18 which are selectively held in a selected angular relationship by the engagement disc 12. Disc 12 incorporates protrusions 14. As shown in the preferred embodiment, disc 12 engages a corresponding disc 34 received on leg 18. However, it is to be understood that the engagement protrusions and recesses which are found in the preferred embodiment on disc 34 could also be impressed directly into an engaged surface on the leg 18.

Referring to FIGS. 1 and 4, it will be seen that the disc 12 may be selectively engaged with a corresponding disc 34 having protrusions 36 which interfit with protrusions 14. Both discs are integrally formed with channel members 30 and 38 which are received over the respective legs 16 and 18 to prevent the rotation of the leg relative to the disc, and to provide a bearing surface for the engagement handwheel and nut. Handwheel 20 is shown to comprise knob 22 and shaft 24 which engages a threaded nut 32 received in channel 38. Friction washers 26 may be used between knob 22 and leg 16 and between the crossed legs 16 and 18, as in FIG. 4, to prevent unintentional loosening of the joint. Referring also to FIG. 5, it will be seen that the disc 12 and its counterpart disc 34 include a plurality of protrusions 14 which are pressed into the surface of the disc during the single stamping operation that forms the entire disc channel and engagement surfaces. It has been discovered that the serrated surfaces which are typical of microphone stands and camera tripods are unsuitable for the rotational forces that can be developed by a load bearing stand. It has been determined that for satisfactory leverage utilizing a mild steel disc, it is necessary to have a disc with at least 3 inches in diameter. The highest practical safety margins are obtained by a disc approximately 4.1 inches in diameter. In order to restrain the rotational forces which can develop at a circumferences greater than 3 inches, it has been found that the height of the protrusions and the depth of the corresponding recesses must be in excess of 0.08 inches and preferably 0.1 inches. Depths in excess of 0.2 inches are difficult to achieve in stamping operations and are unsatisfactory because they require an excessive amount of disengagement movement before the legs can be rotated to a new selected position.

Referring again to FIG. 1, it will be seen that the stand incorporates a plurality of cross-arms 40 and 42 which are secured to the legs 18 and 16 respectively. The cross-arms form feet approximately 14 inches in length and provide a wide range of center-of-gravity positions in which the stand is stable. Load support cross-arms 44 and 48 are located at the upper ends of the legs 16 and 18 respectively and perform the same function for the load. They are shorter (approximately 8 inches in length). Accordingly, they securely support a load over a wide range of positions widthwise and crosswise of the stand but do not allow the center of gravity of the combined load and stand to fall outside the longitudinal extent of the feet. For protection, the ends of cross arms 40, 42, 44 and 48 may be fitted with suitable end caps 50. In order to obtain the function of the cross members, but to retain an attractive appearance for the stand, the legs 16 and 18 incorporate a plurality of press nuts and corresponding screw fasteners of which the press nut and fastener combination on the upper end of leg 18 (see FIGS. 2 and 3) is typical. The leg terminus, of which terminus 52 is typical, is shaped to be received over and conform to the external surface of the cross-members. A screw 58 passes through cross arm 48, the head being seated in a countersunk recess 56. The screw 58 threads into a press nut 62 inserted a short distance into leg 18. The press nut 62 incorporates a plurality of spring fingers 64. The nut is pressed into the open end of the tubing and engages the inner sidewalls of the tubing. Thereafter when the bolt 58 is received into the nut and tension applied, the fingers 64 engage the sidewalls with increasing force, balancing the tendency of the bolt to withdraw the spring nut. A similar arrangement is used to secure cross arm 42 to the lower end of leg 16, as shown in FIG. 7. The resulting fastener provides a very clean appearance comparable to that obtained by welding at a fraction of the cost. The entire stand may be assembled and adjusted with minimum effort and tools, and support substantial loads safely. Having described my invention.

I claim:

1. A load support stand with pivoting legs connected intermediate the ends of the legs comprising:
   a first engagement disc having a plurality of separate protrusions spaced circumferentially from one another, each protrusion spaced radially outwardly in its entirety from the center of said first disc;
   first and second elongated legs adapted to be connected for relative pivotal movement;
   said first disc being secured against rotation relative to said first leg, said second leg having an engagement surface;
   a clamp for pressing said engagement disc against said engagement surface.

2. The load support stand of claim 1, wherein:
   said engagement surface comprises a second engagement disc being secured against rotation relative to said second leg.

3. The load support stand of claim 2, wherein:
   said first and second discs have a plurality of complementary protrusions and indentations spaced the same distance from the center of the respective discs and spaced circumferential from one another by equal increments.

4. The load support stand of claim 3, wherein:
   Each of said first and second discs incorporate a channel sized to be received over the respective one of said first and second legs for preventing relative rotation of said discs on the respective of said first and second legs.

5. The load support stand of claim 4, wherein:
   said channels and engagement surfaces are integral.

6. The load support stand of claim 5, wherein:
   said protrusions and indentations are spaced from the center of said discs by more than 3 inches.

7. The load support stand of claim 6, wherein:
   said protrusions and indentations are spaced from the center of said discs by at least 4 inches.

8. The load support stand of claim 6 wherein:
   said protrusions and indentations are spaced from the center of said discs by approximately 4.1 inches.

9. A load support stand with pivoting legs connected intermediate the ends of the legs, comprising:
   a first engagement disc having a plurality of protrusions spaced circumferentially from one another, said protrusions being spaced radially outwardly from the center of said first disc;
   first and second elongated legs adapted to be connected for relative pivotal movement;
   said first disc being secured against rotation relative to said first leg;
   a second engagement disc secured against rotation relative to said second leg;
   said first and second discs having a plurality of complementary protrusions and indentations spaced the same distance from the center of the respective discs and spaced circumferentially from one another;
   each of said first and second discs incorporating an integral channel sized to be received over the respective one of said first and second legs for preventing relative rotation of said discs on the respective one of said first and second legs;
   a clamp for pressing said first disc against said second disc;
   first and second feet adapted to increasing the stability of said stand and comprising elongated cross-members;

said first and second legs comprising tubing which terminates at the lower ends of said legs with a surface configuration complementary to the exterior configuration of said cross-members; and an internal arm attachment screw fastener within each of said first and second legs adapted for engagement with a screw fastener received through said cross-members.

10. The load support stand of claim 9, wherein:

a plurality of load support cross-arms comprising elongated tubular members with leg engagement surfaces;

the upper ends of said first and second legs comprising tubing having a configuration complementary to the corresponding engagement surfaces on said load support legs;

a screw fastener received through each of said cross-arms;

an internal arm attachment screw fastener mounted within the upper ends of each of said first and second legs adapted for engagement with said screw fasteners on said cross legs.

11. The load support stand of claim 10, wherein:

said internal arm attachment screw fasteners comprise press-fit, spring-nuts.

12. The load support stand of claim 1, wherein:

said clamp comprises a hand-operated screw fastener on one leg adapted to engage a screw fastener received on said second leg.

13. The load support stand of claim 4, wherein:

said clamp comprises a hand-operated bolt having an engagement shoulder which bears on the exterior surface of said channel on said first disc.

14. The load support stand of claim 4, wherein:

each of said first and second discs having plural part circular engagement surfaces having a diameter greater than 3 inches.

15. The load support stand of claim 6, wherein:

said protrusions have a height in excess of 0.08 inches.

16. The load support stand of claim 15, wherein:

said protrusions having a height in the ranges 0.08 to 0.2 inches.

17. The load support stand of claim 15, wherein:

said protrusions having a height of approximately 0.1 inches.

18. The stand as claimed in claim 1, wherein each protrusion has an inner end spaced radially outwardly from the center of said first disc and an outer end spaced radially inwardly from the peripheral edge of said first disc.

19. The stand as claimed in claim 1, wherein said first engagement disc has an outer, flat face facing said engagement surface and said protrusions project outwardly from said flat face.

20. A load support stand, comprising:

first and second legs, each leg having opposite ends;

a pivot member pivotally connecting the legs together at a pivot location intermediate their opposite ends to form a crossed configuration, whereby the legs can be rotated relative to one another about said pivot member to adjust the angle between the crossed legs;

a locking device for positively locking the legs together at a selected angle;

the locking device comprising a first engagement disc secured to said first leg at said pivot location, said first disc having a plurality of protrusions spaced circumferentially from one another around the disc, a second engagement disc on said second leg at said pivot location, said second disc having a plurality of indentations complementary to said protrusions in said first disc, and a clamping device movable between a locked position for positively locking the discs together with the protrusions engaging in aligned indentations in said engagement surface to prevent relative rotation between said legs, and a released position permitting relative rotation between said discs and legs.

* * * * *